3,226,402
2-SUBSTITUTED BENZOFURAN COMPOUNDS AND PROCESS OF MAKING AND USING SAME
Wolfgang Schoetensack, Constance, Guenther Hallmann, Limburgerhof, Pfalz, and Karl Haegele, Hilzingen, Kreis Constance, Germany, assignors to BYK-Gulden-Lomberg Chemische Fabrik G.m.b.H., Constance, Germany, a corporation of Germany
No Drawing. Filed Nov. 2, 1962, Ser. No. 235,151
Claims priority, application Germany, Nov. 3, 1961, B 64,657
9 Claims. (Cl. 260—346.2)

The present invention relates to new and valuable benzofuran compounds and more particularly to substituted or unsubstituted 2-(β-amino ethyl)-benzofuran compounds, to acid addition salts of such compounds, and to a process of making and using same.

It is one object of the present invention to produce new and valuable substituted or unsubstituted 2-(β-amino ethyl)benzofuran compounds and their acid addition salts.

Another object of the present invention is to provide simple and effective methods of producing such 2-(β-amino ethyl) benzofuran compounds and acid addition salts thereof.

A further object of the present invention is to provide new and valuable pharmaceutical 2-(β-amino ethyl)benzofuran compounds with noteworthy pharmacological properties.

Another object of the present invention is to provide pharmaceutical compositions containing such new and valuable 2-(β-amino ethyl) benzofuran compounds and their acid addition salts.

Other objects of the present invention and advantageous features thereof will become apparent as the description proceeds.

In principle, the compound according to the present invention are 2-(β-amino ethyl) benzofuran compounds of the following Formula I:

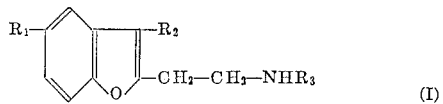

(I)

In said formula $R_1$ indicates an alkoxy group, preferably a lower alkoxy group such as the methoxy group, an aralkoxy group, preferably the benzyloxy group, an aralkyl radical, preferably the benzyl radical or the benzhydryl radical, hydrogen, halogen, preferably chlorine, bromine and iodine, the hydroxyl group, the nitro group, the amino group, an alkylamino group, preferably a lower alkylamino group, an aralkylamino group, preferably the benzylamino group, or an alkyl radical with 1 to 5 carbon atoms which groups may further be substituted;

$R_2$ indicates hydrogen, an alkyl radical having 1 to 5 carbon atoms, or the phenyl radical, which alkyl or phenyl radicals may be substituted; and $R_3$ indicates hydrogen, the residue of an aliphatic carboxylic acid, preferably an aliphatic carboxylic acid with 1 to 5 carbon atoms, or the residue of an aromatic carboxylic acid, which carboxylic acid residues may be substituted.

Such 2-(β-amino ethyl) benzofuran compounds are prepared, for instance, by starting with the corresponding benzofuran carboxylic acid and converting said acid into the corresponding benzofuran-2-diazoketone by first producing the acid chloride by reaction with thionylchloride in dimethyl formamide and then reacting said acid chloride with ethereal diazomethane solution to yield the diazoketone. Said benzofuran-2-diazoketone is recovered from its ethereal solution by careful concentration by evaporation and is recrystallized from a mixture of benzene and cyclohexane. The substituted or unsubstituted resulting benzofuran-2-diazoketone is then reacted with ammonia in the presence of a silver salt, for instance, of silver nitrate whereby the corresponding benzofuran-2-acetic acid amide is obtained in a simple manner by elimination of nitrogen. Said benzofuran-2-acetic acid amide is reduced subsequently by the action of a suitable reducing agent, for instance, of lithium aluminum hydride to the corresponding substituted or unsubstituted 2-(β-amino ethyl) benzofuran. Said compound is isolated either in the form of its acid addition salt, such as in the form of its readily purifiable and crystallizable hydrochloride. The base may also be acylated with substituted or unsubstituted aliphatic carboxylic acids such as acetic acid, propionic acid, butyric acid, lactic acid, chloro carbonic acid ester, or with an aromatic carboxylic acid such as benzoic acid, phthalic acid, or their derivatives which carry a hydroxyl group, a methoxy group, a benzyloxy group, an amino group, or an alkyl radical having 1 to 5 carbon atoms. Acylation can be carried out without difficulty and in a manner known per se.

Another process of producing the new and valuable 2-(β-amino ethyl) benzofuran compounds according to the present invention consists in reducing the respective benzofuran-2-carboxylic acid or, respectively, a reactive derivative thereof, for instance, its ethyl ester by means of a reducing agent, for instance, of lithium aluminum hydride to the corresponding substituted or unsubstituted 2-hydroxy methyl benzofuran. Said compound is obtained in a good yield. Reaction thereof with chlorinating agents such as thionylchloride in pyridine, preferably at room temperature, yields the corresponding 2-chloromethyl benzofuran which can be converted by the action of a metal cyanide, for instance, of sodium cyanide in ethanol into the corresponding substituted or unsubstituted 2-cyano methyl benzofuran. Subsequent reduction of said nitrile, for instance, with lithium aluminum hydride in absolute ether yields the corresponding 2-(β-amino ethyl) benzofuran which can further be reacted and worked up as described hereinabove.

Another process of producing the new and valuable 2-(β-amino ethyl) benzofuran compounds according to the present invention consists in reacting a substituted or unsubstituted benzofuran-2-carboxylic acid or a reactive derivative thereof, for instance, its acid chloride or its lower alkyl ester, such as its methyl ester, with a lower dialkylamine such as dimethylamine to yield the corresponding benzofuran-2-carboxylic acid dialkylamide. The reaction is preferably carried out in an inert organic solvent such as benzene at elevated temperature. The reaction proceeds without difficulty and the corresponding substituted or unsubstituted benzofuran-2-carboxylic acid dialkylamide is obtained in a high yield.

The resulting tertiary amide of the respective benzofuran-2-carboxylic acid is then reduced by means of a suitable reducing agent, for instance, with lithium aluminum hydride in a suitable anhydrous solvent such as ether or dioxane, preferably at elevated temperature. Thereby, the corresponding substituted or unsubstituted 2-dimethylamino methyl benzofuran is obtained in an excellent yield after working up the reaction mixture in a manner known per se.

Subsequent quaternization of said 2-dimethylamino methyl benzofuran by reaction with a lower alkyl halogenide, preferably methyl iodide yields the corresponding 2-dimethylamino methyl benzofuran methiodide. Said compound is then reacted with a metal cyanide, for instance, sodium cyanide in a strongly polar, high boiling solvent such as dimethylformamide at a temperature between about 100° C. and about 150° C. whereby the quaternary ammonium group is eliminated and the corresponding 2-cyano methyl benzofuran is obtained and isolated. Said nitrile is reduced to the corresponding 2-(β-amino ethyl) benzofuran as described hereinabove.

The free base may be reacted with an aliphatic carboxylic acid having 1 to 5 carbon atoms or an aromatic carboxylic acid which acids may be substituted in the manner described hereinabove. If the 2-(β-acylamino ethyl) benzofuran obtained by acylation of the free base contains in 5-position a benzyloxy group, the benzyl group may be removed, if desired, by reduction with palladium and hydrogen in a suitable solvent such as methanol whereby the corresponding 5-hydroxyl-2-(β-acylamino ethyl) benzofuran, i.e., a compound containing a free hydroxyl group is obtained.

It is, of course, also possible to carry out the above described catalytic debenzylation at any suitable reaction step or with any of the hereinabove described intermediate products and to subject subsequently the corresponding 5-hydroxy benzofuran-2-derivative to further reaction steps as mentioned hereinabove.

The compounds obtained according to the present invention possess valuable pharmacological properties. They exhibit, for instance, a high sedative activity. Some compounds have a blood pressure increasing activity. They are valuable new pharmaceutical products of comparatively low toxicity.

The following examples serve to illustrate the present invention without, however, limiting the same thereto.

*Example 1.—3-methyl-5-benzyloxy benzofuran-2-diazoketone*

An ethereal solution of diazomethane is prepared by dissolving 30 g. (0.29 mole) of nitroso methyl urea in 300 cc. of aboslute ether. The acid chloride of 3-methyl-5-benzyloxy benzofuran-2-carboxylic acid is prepared therefrom by treating 12 g. (0.0425 mole) of said acid with 11.9 g. (0.1 mole) of thionylchloride in absolute benzene in a manner known per se. Excess thionylchloride and benzene are removed by distillation. The resulting absolute ethereal solution of the acid chloride is added drop by drop to the above mentioned absolute ethereal diazomethane solution at a temperature of 0–4° C. while stirring. The reaction mixture is allowed to stand at a temperature of 0–10° C. for 12 hours, the ether is carefully removed by evaporation, and the residue is recrystallized from a mixture of benzene and cyclohexane. Melting point: 126–127° C. The yield is 8.7 g. corresponding to 67% of the theoretical yield.

*Example 2.—3-methyl-5-benzyloxy benzofuran-2-acetamide*

7.8 g. (0.0255 mole) of the diazoketone obtained according to Example 1 are dissolved in 100 cc. of absolute dioxane. The solution is added drop by drop to a solution of 8.0 g. (0.047 mole) of silver nitrate in 48 cc. of concentrated ammonia at a temperature of 65–70° C. while stirring. The mixture is heated to 70° C. for 1½ hours and to 100° C. for 1 hour. The silver oxide formed thereby is filtered off by suction, the filtrate is diluted with water, so as to precipitate the acid amide. The precipitate is filtered off by suction and is recrystallized from ethanol. Melting point: 170–171° C. The yield is 5.0 g. corresponding to 66% of the theoretical yield.

*Example 3.—2-(β-amino ethyl)-3-methyl-5-benzyloxy benzofuran hydrochloride*

A solution of 4.0 g. (0.0105 mole) of lithium aluminum hydride in 120 cc. of absolute ether is heated under reflux on a water bath while stirring. A hot solution of 9.2 g. (0.0312 mole) of the reaction product obtained according to Example 2 in 150 cc. of absolute benzene is added drop by drop thereto. The mixture is heated for several hours, the inorganic compounds are removed by suction, and the filtrate is evaporated to dryness. The residue is dissolved in absolute benzene. Absolute ethanolic hydrochloric acid is added thereto. The precipitate is filtered off by suction and recrystallized from a mixture of ethanol and ether. The resulting amine hydrochloride has a metling point of 249–250° C. The yield is 55% of the theoretical yield.

*Example 4.—2-hydroxy methyl-3-methyl-5-methoxy benzofuran*

A solution of 5.0 g. (0.0214 mole) of 3-methyl-5-methoxy benzofuran-2-carboxylic acid ethyl ester in about 150 cc. of absolute ether are added slowly to a solution of 1.0 g. (0.0263 mole) of lithium aluminum hydride in about 50 cc. of absolute ether, while stirring, in such a manner that the ether boils gently. Heating of the mixture to boiling is continued for 10 more minutes. Excess reducing agent is decomposed by careful addition of water and the mixture is then acidified by the addition of 2 N sulfuric acid. The ether layer is separated and evaporated to dryness. The residue is recrystallized from methanol. Melting point: 75.5–76.5° C. The yield is 3.45 g. corresponding to 84% of the theoretical yield.

*Example 5.—2-chloro methyl-3-methyl-5-methoxy benzofuran*

A mixture of 22.0 g. (0.115 mole) of 2-hydroxy methyl-3-methyl-5-methoxy benzofuran and 11.0 g. (0.138 mole) of pyridine in 55 cc. of absolute ether is cooled to 10° C. in a four-necked flask, provided with stirrer, dropping funnel, thermometer, and calcium chloride tube. 15.5 g. (0.13 mole) of thionylchloride in 10 cc. of petroleum ether are added slowly drop by drop thereto in such a manner that the temperature of the reaction mixture increases to 15° C. without further cooling. Stirring is continued at 20° C. for 20 more minutes. The reaction mixture is poured on ice, the ether layer is separated. The residue is extracted with further amounts of ether and is further worked up as described above. The resulting crude chloro methyl compound is further reacted without purification.

*Example 6.—2-cyano methyl-3-methyl-5-methoxy benzofuran*

A solution of the chloro methyl compound obtained according to Example 5 in 120 cc. of ethanol is placed into a three-necked flask, cooled and stirred. 9.1 g. (0.185 mole) of sodium cyanide and 0.4 g. of sodium iodide are added thereto while stirring. The mixture is further stirred for 2 hours while cooling, allowed to stand at 0° C. for 60 hours, and poured on ice. The precipitate is filtered off by suction and is recrystallized from a mixture of benzene and cyclohexane. The resulting cyano methyl compound has a melting point of 100–101° C. The yield is 11.8 g. corresponding to 51% of the theoretical yield.

*Example 7.—2-(β-amino ethyl)-3-methyl-5-methoxy benzofuran hydrochloride*

3.0 g. (0.079 mole) of lithium aluminum hydride are dissolved in 220 cc. of absolute ether in a three-necked flask, provided with stirrer, dropping funnel, reflux condenser and a soda-lime tube, while heating to boiling and stirring. The solution is cooled to a temperature of 20° C. and a solution of 10.4 g. (0.0517 mole) of 2-cyano methyl-3-methyl-5-methoxy benzofuran in 260 cc. of absolute ether is added drop by drop thereto. The reaction mixture is heated to boiling under reflux for four more hours. After cooling, water is carefully added thereto in a nitrogen atmosphere. The precipitate is filtered off by suction and the filtrate is evaporated to dryness. The residue is dissolved in absolute benzene. Anhydrous alcoholic hydrochloric acid is added thereto to adjust the pH-value to a pH of 3.0. The precipitated hydrochloride is filtered off by suction and is recrystallized from a mixture of ethanol and ether. The yield is 24% of the theoretical yield. Melting point: 219–220° C.

*Example 8.—2-(β-N-carbethoxy amino ethyl)-3-methyl-5-methoxy benzofuran*

8.0 g. (0.033 mole) of 2-(β-amino ethyl)-3-methyl-5-methoxy benzofuran hydrochloride obtained according to Example 7 are vigorously stirred with 5.5 g. (0.05 mole) of chloro carbonic acid ethylester, 6.4 g. (0.06 mole) of sodium carbonate, and 150 cc. water at 0° C. for 1 hour. The precipitated urethane is filtered off by suction, dissolved in benzene, and shaken twice with cold 2 N hydrochloric acid. The benzene is evaporated and the residue is recrystallized from cyclohexane. The yield is 2.8 g. corresponding to 36% of the theoretical yield. Melting point: 80–81° C.

*Example 9.—2-(β-N-acetyl amino ethyl)-3-methyl-5-methoxy benzofuran*

5.3 g. (0.022 mole) of 2-(β-amino ethyl)-3-methyl-5-methoxy benzofuran hydrochloride obtained according to Example 7 are stirred with aqueous sodium carbonate solution over which a layer of benzene has been poured. After evaporation of the benzene, 8.0 cc. of glacial acetic acid and finally 8.0 cc. of acetic acid anhydride are added drop by drop to the remaining free amine while shaking. The mixture is heated on the boiling water bath for 45 minutes. Excess acid is evaporated in a vacuum, the residue is dissolved in acetic acid ester and is extracted twice with 2 N hydrochloric acid. The acetic acid ester is evaporated, the residue is recrystallized twice from a mixture of benzene and cyclohexane and finally from water. The yield is 1.5 g. corresponding to 28% of the theoretical yield. Melting point: 93–94° C.

*Example 10.—2-(β-N-carbethoxy amino ethyl)-3-methyl-5-benzyloxy benzofuran*

2.0 g. (0.0063 mole) of 2-(β-aminoethyl)-3-methyl-5-benzyloxy benzofuran hydrochloride obtained according to Example 3 are vigorously stirred with 1.40 g. (0.13 mole) of chloro carbonic acid ethyl ester, 1.4 g. (0.13 mole) of sodium carbonate, and 30 cc. of water at about 0° C. for 1 hour. The precipitated urethane is filtered off by suction, dissolved in benzene, extracted twice with 2 N hydrochloric acid, and the benzene is evaporated. The residue is recrystallized from cyclohexane. The yield is 1.8 g. corresponding to 81% of the theoretical yield. Melting point: 72–73.5° C.

*Example 11.—2-(β-N-acetylamino ethyl)-3-methyl-5-benzyloxy benzofuran*

By proceeding according to Example 9, there is obtained the above mentioned compound by reacting 5.0 g. (0.0157 mole) of 2-(β-amino ethyl)-3-methyl-5-benzyloxy benzofuran hydrochloride, 5.0 cc. of glacial acetic acid, and 5.0 cc. of acetic acid anhydride. The compound has a melting point of 126–127° C. The yield is 3.8 g. corresponding to 74% of the theoretical yield.

Other acid addition salts of the new benzofuran bases than the hydrochlorides may be prepared in a manner known per se whereby, of course, pharmaceutically acceptable acids, the salts of which in the doses administered are substantially non-toxic, are employed for making the acid addition salts. Acids which have been used for this purpose are, for instance, inorganic acids such as hydrobromic acid, sulfuric acid, nitric acid, phosphoric acid, or organic acids, such as acetic acid, propionic acid, malic acid, citric acid, tartaric acid, succinic acid, benzoic acid, salicylic acid, phthalic acid, nicotinic acid, and the like.

The new compounds and their acid addition salts are preferably administered orally in the form of tablets, pills, powders, capsules, solutions, emulsions, suspensions, dispersions, and in any other suitable form. They are preferably not used as such, but are diluted with suitable diluting agents, thus, allowing better and more economical use to be made thereof.

In the case of powders, fine, uniform dispersion of the new compounds within the diluting agent is of importance. Such a fine dispersion can be achieved, for instance, by mixing and milling the new compounds with a solid, pulverulent extending agent to the desired fineness, or by impregnating the already milled, finely powdered, solid carrier with a solution of the active compound in water, or a water-miscible solvent and then removing the water or solvent.

As solid carriers, which are suitable for the manufacture of useful pharmaceutical preparations, various inert pulverulent distributing agents as they are conventionally used in pharmaceutical compounding may be employed. When preparing tablets, pills, powders, and the like, the commonly used diluting agents, binders, lubricants, and the like are added, such as sugar, lactose, talcum, starch, pectins; as binders gelatin, gum arabic, methyl cellulose, yeast extract, agar, tragacanth; and as lubricating agents, magnesium stearate, stearic acid, and others.

The new compounds may, of course, also be administered parenteraly, for instance, by intravenous or intramuscular injection. For this purpose aqueous or saline solutions, especially of their water soluble acid addition salts, or suspensions therein may be used.

Rectal application in the form of conventional suppositories is also possible.

Of course, many changes and variations in the starting materials, in the reaction conditions, temperature, duration, solvents used, catalysts employed, in the methods of working up the reaction mixture and of purifying the benzofuran compounds and their acid addition salts, and the like may be made by those skilled in the art in accordance with the principles set forth herein and in the claims annexed hereto.

We claim:
1. 2-(β-amino ethyl)-3-methyl-5-benzyloxy benzofuran.
2. 2-(β-amino ethyl)-3-methyl-5-benzyloxy benzofuran hydrochloride.
3. 2-(β-N-carbethoxy amino ethyl)-3-methyl-5-benzyloxy benzofuran.
4. 2-(β-N-acetylamino ethyl)-3-methyl-5-benzyloxy benzofuran.
5. 2-(β-amino ethyl)-3-methyl-5-methoxy benzofuran.
6. 2-(β-amino ethyl)-3-methyl-5-methoxy benzofuran hydrochloride.
7. 2-(β-N-carbethoxy amino ethyl)-3-methyl-5-methoxy benzofuran.
8. 2-(β-N-acetylamino ethyl)-3-methyl-5-methoxy benzofuran.
9. A 2-substituted benzofuran compound selected from the group consisting of a 2-(β-amino ethyl) benzofuran compound of the formula

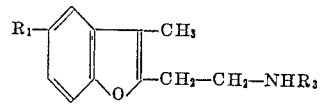

wherein $R_1$ indicates a member selected from the group consisting of methoxy and benzyloxy and
$R_3$ indicates a member selected from the group consisting of hydrogen, acetyl, and carbethoxy, and its pharmaceutically acceptable acid addition salts.

References Cited by the Examiner
UNITED STATES PATENTS 3,033,875  5/1962  Nutting et al. _____ 260—346.2
3,070,606  12/1962  Anderson _____ 260—346.2

NICHOLAS S. RIZZO, *Primary Examiner.*